(12) United States Patent
Radek

(10) Patent No.: US 9,153,096 B2
(45) Date of Patent: Oct. 6, 2015

(54) AUDIO MARKERS IN A COMPUTERIZED WAGERING GAME

(75) Inventor: Paul Radek, Naperville, IL (US)

(73) Assignee: Bally Gaming Inc., Las Vegas, NV (US)

(*) Notice: Subject to any disclaimer, the term of this patent is extended or adjusted under 35 U.S.C. 154(b) by 911 days.

(21) Appl. No.: 11/576,456

(22) PCT Filed: Sep. 29, 2005

(86) PCT No.: PCT/US2005/034629
§ 371 (c)(1),
(2), (4) Date: Mar. 30, 2007

(87) PCT Pub. No.: WO2006/039284
PCT Pub. Date: Apr. 13, 2006

(65) Prior Publication Data
US 2008/0009347 A1    Jan. 10, 2008

Related U.S. Application Data

(60) Provisional application No. 60/615,564, filed on Oct. 1, 2004.

(51) Int. Cl.
*A63F 13/00* (2014.01)
*G07F 17/32* (2006.01)
*G11B 27/30* (2006.01)

(52) U.S. Cl.
CPC ............ *G07F 17/3227* (2013.01); *G07F 17/32* (2013.01); *G11B 27/3027* (2013.01)

(58) Field of Classification Search
CPC .. G07F 17/3227; G07F 17/32; G11B 27/3027
USPC .......... 463/40–42, 30–35; 84/609; 434/307 A
See application file for complete search history.

(56) References Cited

U.S. PATENT DOCUMENTS

| | | | |
|---|---|---|---|
| 4,522,399 A | 6/1985 | Nishikawa | |
| 5,315,057 A * | 5/1994 | Land et al. ...................... | 84/601 |
| 5,430,835 A | 7/1995 | Williams et al. | |
| 5,472,197 A | 12/1995 | Gwiasda et al. | |
| 5,588,096 A | 12/1996 | Sato et al. | |
| 5,688,096 A | 11/1997 | Gagnon et al. | |
| 5,693,903 A * | 12/1997 | Heidorn et al. ................. | 84/668 |
| 5,695,188 A | 12/1997 | Ishibashi | |
| 5,701,511 A | 12/1997 | Smith | |

(Continued)

FOREIGN PATENT DOCUMENTS

WO    WO-2006/039284 A2    4/2006

OTHER PUBLICATIONS

"International Search Report for Application No. PCT/US2005/034629, date mailed Jan. 29, 2007", 6 pgs.

(Continued)

*Primary Examiner* — Ronald Laneau
*Assistant Examiner* — Ross Williams
(74) *Attorney, Agent, or Firm* — Nixon Peabody LLP

(57) ABSTRACT

A computerized wagering game system has a gaming module comprising a processor and gaming code which is operable when executed on the processor to present or conduct a wagering game on which monetary value can be wagered. An audio module is operable to process markers embedded within an audio stream, wherein the markers comprise structured audio commands.

30 Claims, 2 Drawing Sheets

(56) References Cited

U.S. PATENT DOCUMENTS

| | | | |
|---|---|---|---|
| 5,734,923 | A | 3/1998 | Sagawa et al. |
| 5,859,904 | A | 1/1999 | Huang |
| 5,908,354 | A | 6/1999 | Okuniewicz |
| 5,952,598 | A | 9/1999 | Goede |
| D421,277 | S | 2/2000 | McGahn et al. |
| 6,116,907 | A | 9/2000 | Baker et al. |
| 6,126,165 | A | 10/2000 | Sakamoto |
| 6,174,233 | B1 | 1/2001 | Sunaga et al. |
| 6,302,790 | B1 | 10/2001 | Brossard |
| 6,415,303 | B1 | 7/2002 | Meier et al. |
| 6,490,553 | B2 | 12/2002 | Van Thong et al. |
| 6,505,153 | B1 | 1/2003 | Van Thong et al. |
| 6,530,842 | B1 | 3/2003 | Wells et al. |
| 6,561,908 | B1 | 5/2003 | Hoke |
| 6,597,861 | B1 | 7/2003 | Tozaki et al. |
| 6,625,388 | B2 | 9/2003 | Winter et al. |
| 6,636,238 | B1 | 10/2003 | Amir et al. |
| 6,638,169 | B2 | 10/2003 | Wilder et al. |
| 6,654,863 | B2 | 11/2003 | Nishio |
| 6,788,880 | B1 | 9/2004 | Fuchigami et al. |
| 6,802,019 | B1 | 10/2004 | Lauder |
| 7,181,636 | B2 | 2/2007 | Kim et al. |
| 2002/0160831 | A1 | 10/2002 | Rubeli |
| 2002/0173219 | A1 | 11/2002 | Kilstrom |
| 2003/0073489 | A1 | 4/2003 | Hecht et al. |
| 2003/0119575 | A1 | 6/2003 | Centuori et al. |
| 2004/0029637 | A1 | 2/2004 | Hein et al. |
| 2004/0147300 | A1 | 7/2004 | Seelig et al. |
| 2004/0184473 | A1 | 9/2004 | Tavli et al. |
| 2004/0240855 | A1 | 12/2004 | Kagle |
| 2005/0211768 | A1 | 9/2005 | Stillman |
| 2005/0227614 | A1 | 10/2005 | Hosking et al. |
| 2005/0275626 | A1 | 12/2005 | Mueller et al. |
| 2006/0019733 | A1 | 1/2006 | D'Avanzo |
| 2007/0127726 | A1 | 6/2007 | Ellis et al. |
| 2007/0128979 | A1 | 6/2007 | Shackelford et al. |

OTHER PUBLICATIONS

"Written Opinion of the International Searching Authority for Application No. PCT/US2005/034629, date mailed Jan. 29, 2007", 5 pgs.

"U.S. Appl. No. 10/658,975, Final Office Action mailed Jul. 20, 2007", 7 pgs.

"U.S. Appl. No. 10/658,975, Non Final Office Action mailed Nov. 2, 2006", 6 pgs.

"U.S. Appl. No. 10/658,975, Response filed Feb. 2, 2007 to Non Final Office Action mailed Nov. 2, 2006", 9 pgs.

"U.S. Appl. No. 10/658,975, Response filed Jun. 16, 2008 to Non Final Office Action mailed Jan. 15, 2008", 8 pgs.

"U.S. Appl. No. 10/658,975, Final Office Action mailed Jul. 24, 2008", 11 pgs.

"U.S. Appl. No. 10/658,975, Non-Final Office Action mailed Jan. 15, 2008", 8 pgs.

"U.S. Appl. No. 10/658,975, Response filed Dec. 20, 2007 to Final Office Action mailed Jul. 20, 2007", 9 pgs.

"U.S. Appl. No. 10/832,525, Response filed Mar. 24, 2008 to Final Office Action mailed Jan. 24, 2008", 9 pgs.

"U.S. Appl. No. 10/832,525, Response filed May 27, 2008 to Final Office Action mailed Jan. 24, 2008", 11 pgs.

"U.S. Appl. No. 10/832,525, Advisory Action mailed Apr. 8, 2008", 3 pgs.

"U.S. Appl. No. 10/832,525, Non Final Office Action mailed Jul. 20, 2007", 16 pgs.

"U.S. Appl. No. 10/832,525, Final Office Action mailed Jan. 24, 2008", 16 pgs.

"U.S. Appl. No. 10/832,525, Non-Final Office Action mailed Jul. 21, 2008", 14 pgs.

"U.S. Appl. No. 10/832,525, Response filed Dec. 20, 2007 to Non-Final Office Action mailed Jul. 20, 2007", 11 pgs.

"Australian Application Serial No. 2005292291, Examiner's First Examination Report mailed Jul. 23, 2008", 2 pgs.

"International Application Serial No. PCT/US05/34629 International Search Report mailed Jan. 29, 2007", 4 pgs.

International Application Serial No. PCT/US05/34629 Written Opinion mailed Jan. 29, 2007, 5 pgs.

"U.S. Appl. No. 10/832,525, Final Office Action mailed May 14, 2009", 11 pgs.

\* cited by examiner

AUDIO MARKERS IN A COMPUTERIZED WAGERING GAME

RELATED APPLICATION(S)

This application is a U.S. National Stage Filing under 35 U.S.C. 371 from International Patent Application Serial No. PCT/US2005/034629 filed 29 Sep. 2005 and published on 13 Apr. 2006 as WO 2006/039284, which claims the priority benefit of U.S. Provisional Application Ser. No. 60/615564, filed 1 Oct. 2004, the contents of which are incorporated herein by reference.

FIELD OF THE INVENTION

The invention relates generally to audio in wagering gaming systems, and more specifically to audio markers in a computerized wagering game system.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

A wide variety of gaming devices are now available to gamers and to casino operators in computerized form, from slot machines to games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

Computerized video game systems must be designed with many of the same concerns as their mechanical and table game ancestors—they must be fair, they must provide sufficient feedback to the gamer to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Many computerized wagering game systems have a variety of sound and graphical elements designed to attract and keep a game player's attention, such as sound effects, music, and animation. These game presentation features often include a variety of music, sound effects, and voices presented to complement a video presentation of the wagering game on a display.

But, many challenges are faced in presenting audio to enhance a wagering game. Sounds must be stored on the wagering game system, which requires storage space and is expensive despite many sounds being stored in a compressed format. Even when compressed, sounds must be decompressed to be played, resulting in consumption of significant processor resources.

Further, it is difficult to coordinate the playing of sounds with animation or wagering game activity presented on the screen, particularly when sounds and animations presented run for significant lengths of time. Starting and stopping various audio clips or sounds repeatedly can be distracting as a solution can also be problematic, as this requires management of a greater number of audio clips and the transition between audio clips is often audible due to DC offsets or other sharp transitions.

It is therefore desirable to better manage the audio presented in the computer wagering game.

SUMMARY OF THE INVENTION

The present invention provides in one embodiment a computerized wagering game system having a gaming module comprising a processor and gaming code which is operable when executed on the processor to conduct a wagering game on which monetary value can be wagered. An audio module is operable to process markers embedded within an audio stream, wherein the markers comprise structured audio commands.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in one example embodiment a computerized wagering game system having a gaming module comprising a processor and gaming code which is operable when executed on the processor to conduct or present a wagering game on which monetary value can be wagered, and an audio module that is operable to process markers embedded within an audio stream, wherein the markers comprise structured audio commands.

Figure 1:
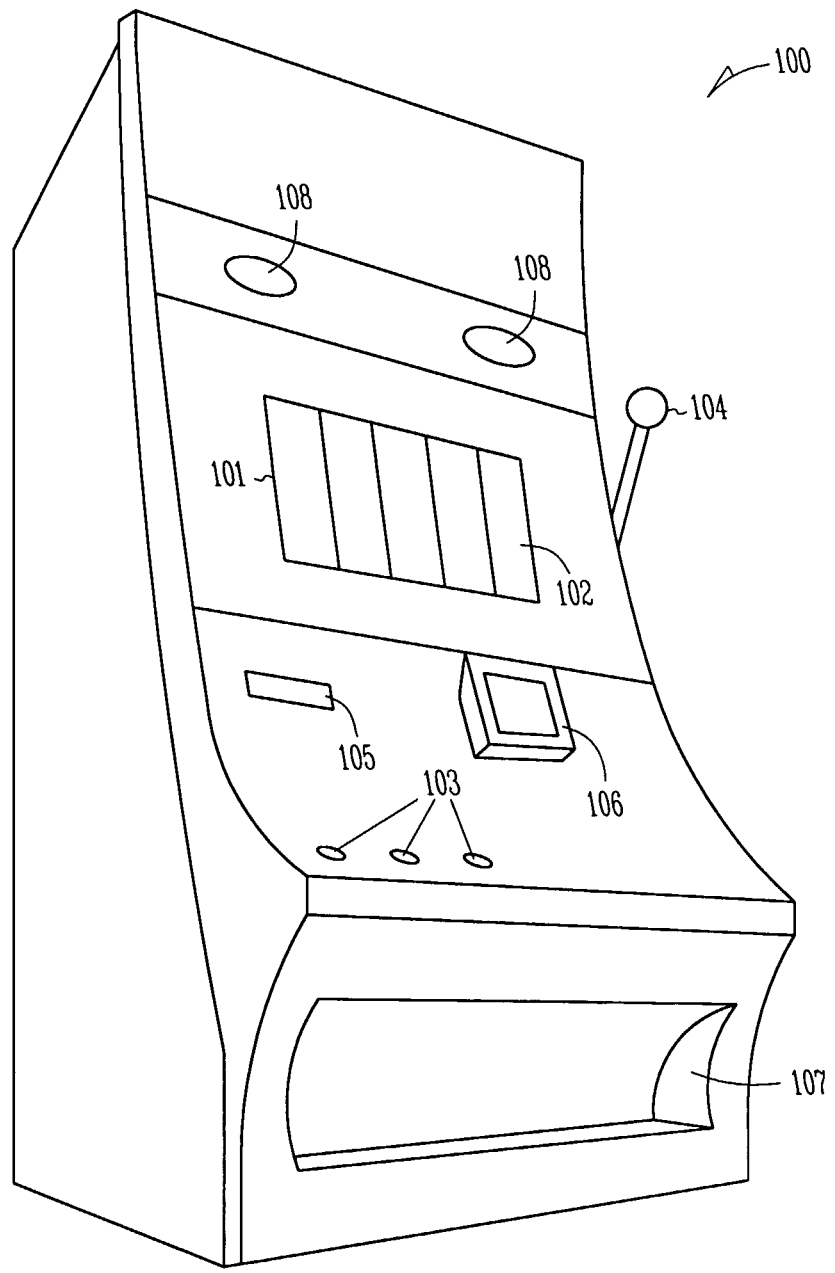
FIG. 1 shows a computerized reel slot gaming system employing an audio module operable to process audio stream markers, consistent with an example embodiment of the present invention.

FIG. 1 illustrates a computerized wagering game machine, as may be used in an embodiment of the present invention. The computerized gaming system shown generally at 100 is a video wagering game system, which displays information for at least one wagering game upon which monetary value can be wagered on video display 101. Video display 101 is in various embodiments a CRT display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A game of chance is implemented as software within the wagering game, such as via instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. The game of chance takes various forms in different wagering game machines, and includes such well-known wagering games as reel slots, video poker, blackjack, craps, roulette, or hold 'em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108. In some further embodiments, the wagering game machine is coupled to a network, and is operable to use its network connection to receive wagering game data, track players and monetary value associated with a player, and to perform other such functions.

Figure 2:
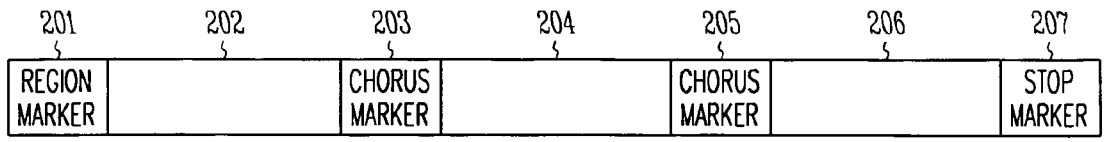
FIG. 2 shows an audio stream with embedded markers, consistent with an example embodiment of the present invention.

FIG. 2 illustrates the content of an audio stream with embedded markers, consistent with an example embodiment of the present invention. The audio stream portion illustrated begins with a region marker 201 that identifies the particular region of the audio stream and in various embodiments contains data such as the length of the region and the region name or other identifier. The following data in section 202 is audio data that is a part of the defined region, while 203 is a chorus marker within the region. Upon reaching the chorus marker, the marker is passed to the audio module which plays the chorus before proceeding through the audio stream of FIG. 2. In some embodiments, the chorus marker identifies a specific chorus by name, number, or other identifier. Upon completing the chorus, the audio module resumes playing the audio stream data 204, until reaching another chorus marker that is similarly processed at 205. Upon subsequent completion of playing the audio stream data contained in portion 206 of the encoded audio stream, a stop marker is reached at 207 which triggers a controlled stop of play of the audio stream.

In some embodiments of the invention, the stop marker need not be present to identify the point at which the audio module is to stop playing a region, as the region marker in some embodiments identifies a region length that defines the size of a region so that when a region is played only a certain length of audio stream data is played. The stop marker 207 in some embodiments is processed by the audio module to create a smooth or gradual stop rather than a hard transition from playing an audio stream to not playing the audio stream. In many existing systems, stopping playback of an audio stream at an arbitrary point results in stopping while the audio signal is at a voltage level other than zero, resulting in a sharp pop or click as the audio signal voltage transitions abruptly to a zero level. Various embodiments of the present invention transition to a zero voltage level in a slow or controlled manner, or simply wait until the voltage level reaches zero to stop.

Figure 3:
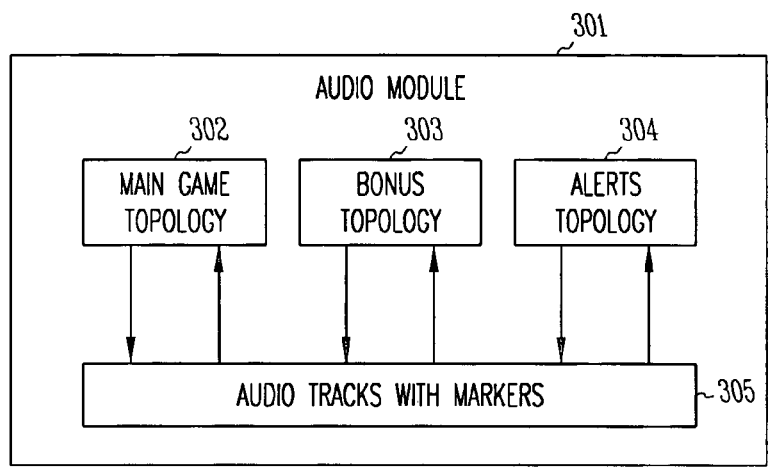
FIG. 3 shows a modular view of an audio module supporting multiple audio topologies, consistent with an example embodiment of the present invention.

In one audio module example, the audio module comprises multiple topologies, each operable to independently manage playback of audio streams, as is illustrated in FIG. 3. The audio module 301 includes a separate audio topology for the main game at 302, bonus events 303, and alerts 304. Each is operable to read audio stream data 305 and to receive and process markers embedded in the audio streams, as well as to communicate control data with other executing applications such as a wagering game module that conducts a game of chance on which monetary value can be wagered.

In operation, the volume, playback state, and other such parameters of each topology are independently managed, and do not affect the topology state of other topologies. In one example, when a wagering game machine experiences an exception condition and the game is halted, the main game topology and the bonus topology are muted or paused while the alerts topology continues to be operable to play alert sounds to attract a floor manager's attention. In other embodiments, other categories of topologies are used so that audio can be independently controlled for different categories of sound.

Figure 4:
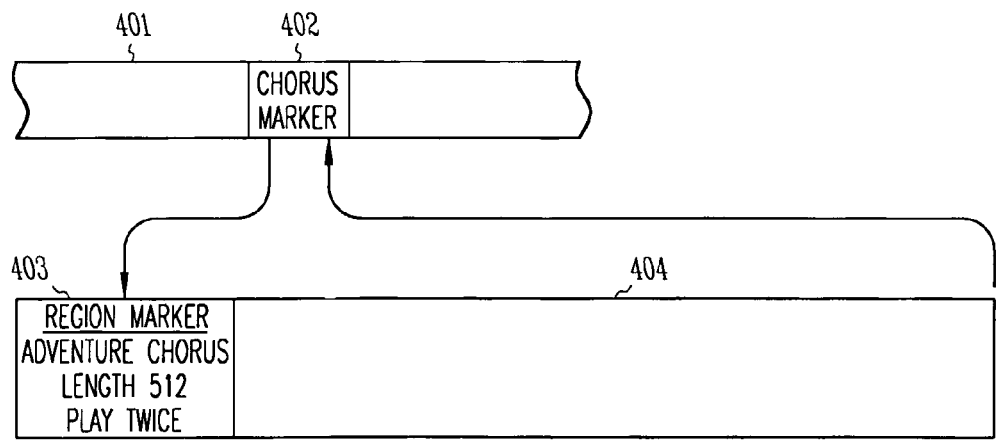
FIG. 4 shows an audio stream with an embedded chorus marker and a chorus audio stream with embedded markers, consistent with an example embodiment of the present invention.

FIG. 4 illustrates how markers embedded in an audio stream can control playback of the audio stream through the data embedded in the markers. Audio stream 401 has a chorus marker 402, which calls a chorus named "adventure". The audio topology then begins playing back the adventure chorus, identified by the region marker 403 of the adventure chorus audio stream 404. The region marker 403 comprises a region name or other identifier, which in this example is the name "adventure". It also defines the length of the audio stream as 512 segments, and contains the instruction that the chorus is to be repeated twice. After the adventure chorus of 512 segments is played twice, the audio module returns audio stream processing to the audio stream 401.

Other markers are used to provide different feedback or control signals to the audio module, the audio topology, or other application software. A beat marker embedded in the audio stream is able to indicate the timing of a beat in the music contained in the audio stream, enabling the software to receive the beat marker data and synchronize video or other events to beats in the music. A break marker is operable to break play of an audio stream, either immediately or on a zero crossing event in various embodiments. A chorus marker is operable to call a chorus region of audio stream data, as illustrated in FIG. 4. A topo marker identifies the topology in which an audio stream should be played, or to which other audio markers should be passed. A stop marker indicates that playback is to stop, such as on a zero crossing or via a slow transition to being inaudible. A wait marker enables an audio stream to wait for a signal before proceeding through playing an audio stream, such as receiving a signal that a video event is beginning to coordinate playback of an audio stream to accompany the video event. Similarly, other signal markers are able to send other signals and marker data to the audio engine.

Use of the embedded markers relies upon having both an audio stream format able to store the embedded marker data and an audio engine able to receive and interpret the audio markers. In some embodiments, standard audio file formats are used with markers embedded in reserved non-audio locations, or with markers embedded as inaudible components of the actual audio signal. The audio engine is designed specifically to receive and decode the marker data, and to process it according to the marker type and data contained within the marker.

Markers can be placed in audio streams in a number of ways, such as by using unused or reserved fields in various music coding formats or by encoding inaudible signals in the music stream that are detectable and interpretable as marker data. Because many lossy formats for music compression would discard inaudible information encoded into the audio stream such as embedded positional information or other such data that may be used by the audio engine in playback, such embodiments will often use lossless compression such as rice coding, Meridian lossless packing, MP4 lossless encoding, or other such lossless encoding schemes. Still other audio formats, such as the WAV audio file format, are uncompressed and have reserved space into which markers can be easily inserted.

Use of markers in compressed audio streams further enables selective decompression or decoding of the encoded data, whether lossless or lossy, because only the audio stream data in a called region, chorus, or other segment of the audio stream needs to be decoded at a given time. Various embodiments of the invention will decode future or soon-to-be-used regions of the audio stream, but need not decode or decompress an entire audio stream to manage playback using markers. This improves system performance, and reduces the demand on an audio module that would otherwise need to decode or decompress an entire audio file.

The examples shown herein have illustrated how markers embedded in an audio stream can be used in a computerized wagering game system to send non-audio data as structured commands to an audio module. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A computerized wagering game system for playing at least one casino wagering game on which monetary value can be wagered, the computerized wagering game system comprising:
    a gaming machine including
        one or more electronic input devices configured to receive a physical item associated with a monetary value that establishes a credit balance, to identify the physical item, and to receive a cashout input that initiates a payout from the credit balance, the credit balance changing based on play of the casino wagering game,
        an electronic display device for displaying the casino wagering game, and one or more speakers for playback of an audio stream;
    a gaming module comprising a processor and a gaming memory storing a plurality of gaming device instructions that are operable when executed on the processor to initiate the casino wagering game in response to a wager input, the wager input decreasing the credit balance, and
    present the casino wagering game on the electronic display device; and
    an audio module operable to process markers embedded within the audio stream, wherein the audio module comprises a plurality of submodules, each submodule operable to read the audio stream, and wherein the markers comprise a first marker and a second marker, the first marker indicating a submodule from the plurality of submodules in the audio module, and wherein the submodule from the plurality of submodules is operable to read the first marker and conditionally process the second marker to manage playback of the audio stream substantially independently from other submodules of the plurality of submodules when the first marker indicates that the submodule is the submodule to process the second marker.

2. The computerized wagering game system of claim 1, wherein processing the markers comprises passing marker data to an application.

3. The computerized wagering game system of claim 1, wherein the markers comprise beat markers operable to identify a beat location within the audio stream.

4. The computerized wagering game system of claim 1, wherein the markers comprise break markers operable when processed to cause playback of the audio stream to stop.

5. The computerized wagering game system of claim 4, wherein the audio stream stop occurs at a zero crossing point of the audio stream.

6. The computerized wagering game system of claim 1, wherein the audio environment comprises multiple independently managed audio playback environments.

7. The computerized wagering game system of claim 1, wherein the markers comprise stop markers operable when processed to cause a controlled stop of the audio stream playback.

8. The computerized wagering game system of claim 1, wherein the markers comprise wait markers operable when processed to cause the audio module to wait for a signal before proceeding through playing the audio stream.

9. The computerized wagering game system of claim 1, wherein the markers comprise signal markers operable to send data embedded in the signal marker to an application.

10. The computerized wagering game system of claim 1, wherein the markers comprise region markers used to identify regions within the audio stream.

11. The computerized wagering game system of claim 10, wherein the region markers comprise region length data.

12. The computerized wager game system of claim 1, wherein other submodules of the plurality of submodules are muted while the submodule manages playback of the audio stream.

13. The computerized wager game system of claim 1, wherein other submodules of the plurality of submodules are paused while the submodule manages playback of the audio stream.

14. The computerized wager game system of claim 1, wherein the audio stream is related to a sound category, and wherein a submodule category is used to control playback based on the sound category.

15. A method of operating a computerized wagering game system for playing at least one casino wagering game on which monetary value can be wagered, the computerized wagering game system having a gaming machine including one or more electronic input devices, an electronic display device, and one or more speakers, the game system further having a gaming module with a processor and a gaming memory storing a plurality of gaming device instructions, the method comprising:
    detecting, via at least one of the one or more electronic input devices, a physical item associated with a monetary value, the monetary value establishing a credit balance that changes based on play of the casino wagering game;
    receiving, via at least one of the one or more electronic input devices, a wager input to initiate the casino wagering game, the wager input decreasing the credit balance;

presenting, on the electronic display device, the casino wagering game;

receiving, via at least one of the one or more electronic input devices, a cashout input that initiates a payout from the credit balance;

directing the speakers to playback an audio stream; and processing markers embedded within the audio stream in an audio module, wherein the audio module comprises a plurality of submodules, each submodule operable to read the audio stream, and wherein the markers comprise a first marker and a second marker, the first marker indicating a submodule from the plurality of submodules in the audio module, and wherein the submodule from the plurality of submodules is operable to read the first marker and conditionally process the second marker to manage playback of the audio stream substantially independently from other submodules of the plurality of submodules when the first marker indicates that the submodule is the submodule to process the second marker.

16. The method of claim 15, wherein processing, via the audio module, the markers comprises passing marker data to an application.

17. The method of claim 15, wherein the markers comprise beat markers operable to identify a beat location within the audio stream.

18. The method of claim 15, wherein the markers comprise break markers operable when processed to cause playback of the audio stream to stop.

19. The method of claim 18, wherein the audio stream stop occurs at a zero crossing point of the audio stream.

20. The method of claim 15, wherein the audio environment comprises multiple independently managed audio playback environments.

21. The method of claim 15, wherein the markers comprise stop markers operable when processed to cause a controlled stop of the audio stream playback.

22. The method of claim 15, wherein the markers comprise wait markers operable when processed to cause the audio module to wait for a signal before proceeding through playing the audio stream.

23. The method of claim 15, wherein the markers comprise signal markers operable to send data embedded in the signal marker to an application.

24. The method of claim 15, wherein the markers comprise region markers used to identify regions within the audio stream.

25. The method of claim 24, wherein the region markers comprise region length data.

26. The method of claim 15, further comprising muting other submodules of the plurality of submodules while the submodule manages playback of the audio stream.

27. The method of claim 15, further comprising pausing other submodules of the plurality of submodules while the submodule manages playback of the audio stream.

28. The method of claim 15, wherein the audio stream is related to a sound category, and further comprising using a submodule category to control playback based on the sound category.

29. A computerized wagering game system for playing at least one casino wagering game on which monetary value can be wagered, the computerized wagering game system comprising:

a gaming machine including
one or more electronic input devices configured to receive a physical item associated with a monetary value that establishes a credit balance, to identify the physical item, and to receive a cashout input that initiates a payout from the credit balance, the credit balance changing based on play of the casino wagering game, an electronic display device for displaying the casino wagering game, and one or more speakers for playback of an audio stream;

a gaming module comprising a processor and a gaming memory storing a plurality of gaming device instructions that are operable when executed on the processor to initiate the casino wagering game in response to a wager input, the wager input decreasing the credit balance, and present the casino wagering game on the electronic display device; and an audio module operable to process markers embedded within the audio stream, wherein the audio module comprises a plurality of submodules, each submodule operable to read the audio stream, wherein the markers comprise wait markers operable when processed to cause the audio module to wait for a signal before proceeding through playing the audio stream, and wherein the markers comprise a first marker and a second marker, the first marker indicating a submodule from the plurality of submodules in the audio module, and wherein the submodule from the plurality of submodules is operable to read the first marker and conditionally process the second marker playback of the audio stream substantially independently from other submodules of the plurality of submodules when the first marker indicates that the submodule is the submodule to process the second marker.

30. A method of operating a computerized wagering game system for playing at least one casino wagering game on which monetary value can be wagered, the computerized wagering game system having a gaming machine including one or more electronic input devices, an electronic display device, and one or more speakers, the game system further having a gaming module with a processor and a gaming memory storing a plurality of gaming device instructions, the method comprising:

detecting, via at least one of the one or more electronic input devices, a physical item associated with a monetary value, the monetary value establishing a credit balance that changes based on play of the casino wagering game;

receiving, via at least one of the one or more electronic input devices, a wager input to initiate the casino wagering game, the wager input decreasing the credit balance;

presenting, on the electronic display device, the casino wagering game;

receiving, via at least one of the one or more electronic input devices, a cashout input that initiates a payout from the credit balance;

directing the speakers to playback an audio stream; and processing markers embedded within the audio stream in an audio module, wherein the audio module comprises a plurality of submodules, each submodule operable to read the audio stream, wherein the markers comprise wait markers operable when processed to cause the audio module to wait for a signal before proceeding through playing the audio stream, and wherein the markers comprise a first marker and a second marker, the first marker indicating a submodule from the plurality of submodules in the audio module, and wherein the submodule from the plurality of submodules is operable to read the first marker and conditionally process the second marker to manage playback of the audio stream substantially independently from other submodules of the plurality of submodules when the first marker indicates that the submodule is the submodule to process the second marker.

* * * * *